US008285473B1

(12) United States Patent
Ravenscroft

(10) Patent No.: US 8,285,473 B1
(45) Date of Patent: Oct. 9, 2012

(54) PREDICTIVE RELEVANT TRAFFIC DETERMINATION USING VEHICLE STATES DESCRIPTIONS

(75) Inventor: Donald L. Ravenscroft, Broomfield, CO (US)

(73) Assignee: The Boeing Company, Chicago, IL (US)

( * ) Notice: Subject to any disclaimer, the term of this patent is extended or adjusted under 35 U.S.C. 154(b) by 615 days.

(21) Appl. No.: 12/499,927

(22) Filed: Jul. 9, 2009

(51) Int. Cl.
*G06F 19/00* (2006.01)

(52) U.S. Cl. ........................................ 701/120; 701/117

(58) Field of Classification Search ......................... None
See application file for complete search history.

(56) References Cited

U.S. PATENT DOCUMENTS 5,519,618 A * 5/1996 Kastner et al. ................ 701/120
7,212,917 B2 5/2007 Wilson, Jr.
7,457,690 B2 11/2008 Wilson, Jr. et al.
8,019,529 B1 * 9/2011 Sharma et al. ................ 701/117
2003/0033178 A1 * 2/2003 Black et al. ........................ 705/7
2005/0015202 A1 * 1/2005 Poe et al. ....................... 701/301
2006/0224318 A1 10/2006 Wilson, Jr. et al.
2007/0021915 A1 * 1/2007 Breed et al. ................... 701/301
2007/0152804 A1 * 7/2007 Breed et al. ................... 340/435
2008/0294749 A1 11/2008 Derenge et al.
2010/0152932 A1 * 6/2010 Das ................................. 701/14

FOREIGN PATENT DOCUMENTS

WO WO02008/001493 A1 * 1/2008

* cited by examiner

*Primary Examiner* — Michael J. Zanelli
(74) *Attorney, Agent, or Firm* — Yee & Associates, P.C.

(57) ABSTRACT

A method and apparatus for predicting traffic for analyzing runway incursions. A state for each of a plurality of aircraft is identified to form a plurality of identified states. A set of aircraft is identified from the plurality of aircraft based on the plurality of identified states to form a set of identified aircraft. A number of potential runway incursions is predicted using the set of identified aircraft.

24 Claims, 8 Drawing Sheets

FIG. 4A

400

<table>
<tr><td></td><td>430</td><td>432</td><td>434</td><td>436</td><td>438</td><td>440</td><td>442</td><td></td></tr>
<tr><td>Own ship NEW state</td><td>Taxi Adj TWY (8)</td><td>Departing (6)</td><td>Approach (1)</td><td>Final App (2)</td><td>Landed (3)</td><td>Taxiing on RWY (4)</td><td>Stopped RWY (5)</td><td></td></tr>
<tr><td>Own Ship Current State</td><td></td><td></td><td></td><td></td><td></td><td></td><td></td><td></td></tr>
<tr><td>Taxi Adj TWY (8)</td><td>Turn on Adj TWY |<br>s<=40kn</td><td>dc<br>s>=40kn<br>PC</td><td></td><td></td><td></td><td></td><td></td><td>402</td></tr>
<tr><td>Departing (6)</td><td></td><td>s>=40kn</td><td></td><td></td><td></td><td>s>0 &<br><=40kn</td><td></td><td>404</td></tr>
<tr><td>Approach (1)</td><td></td><td></td><td>dc<br>d(TH)>3nm</td><td>d(TH)<=3nm |<br>t(TH)<=35s</td><td></td><td></td><td></td><td>406</td></tr>
<tr><td>Final App (2)</td><td></td><td></td><td></td><td>d(TH)<=3nm |<br>t(TH)<=35s</td><td>Wonw &<br>s>40kn</td><td></td><td></td><td>408</td></tr>
<tr><td>Landed (3)</td><td></td><td>GOAROUND</td><td></td><td></td><td></td><td>s>0 & <=40kn</td><td></td><td>410</td></tr>
<tr><td>Taxiing on RWY (4)</td><td>TURN on Adj TWY</td><td>s>=40kn</td><td></td><td></td><td></td><td>s>0 & <=40kn</td><td>s=0kn</td><td>412</td></tr>
<tr><td>Stopped RWY (5)</td><td></td><td></td><td></td><td></td><td></td><td>s>0 & <=40kn</td><td>s=0kn</td><td>414</td></tr>
<tr><td>Ent/Cross RWY (9)</td><td>TURN on Adj TWY</td><td>s>=40kn</td><td></td><td></td><td></td><td>s>0 & <=40kn<br>TURN on RWY</td><td>s=0kn</td><td>416</td></tr>
<tr><td>Taxi Non-Adj TWY (7)</td><td>TURN on Adj TWY</td><td>dc<br>s>=40kn<br>PC</td><td></td><td></td><td></td><td></td><td></td><td>418</td></tr>
<tr><td>In Flight (10)</td><td></td><td></td><td>Start Decent</td><td></td><td></td><td></td><td></td><td>420</td></tr>
<tr><td>Stopped on Adj TWY (11)</td><td>TURN on Adj TWY</td><td></td><td></td><td></td><td></td><td></td><td></td><td>422</td></tr>
<tr><td>Stopped on non-adj TWY (12)</td><td>TURN on Adj TWY</td><td></td><td></td><td></td><td></td><td></td><td></td><td>424</td></tr>
<tr><td>Gate</td><td></td><td></td><td></td><td></td><td></td><td></td><td></td><td>426</td></tr>
<tr><td>Off Surface Excursion</td><td></td><td></td><td></td><td></td><td></td><td></td><td></td><td>428</td></tr>
</table>

| FIG. 4A | FIG. 4B |
|---|---|

FIG. 4

FIG. 4B

400

| | 444 | 446 | 448 | 450 | 452 | 454 | 456 | 458 |
|---|---|---|---|---|---|---|---|---|
| | Ent/Cross RWY (9) | Taxi Non-Adj TWY (7) | In Flight (10) | Stopped on Adj TWY (11) | Stopped on non-adj TWY (12) | Gate | Off surface Excursion | Wrong Surface Confusion |
| | | | | | | | | |
| 402 | Cross Hold Line | Turn non-Adj TWY | | s=0kn | | ARRIVE GATE | dc - Enter Non-Surface area | dc<br>s>=0kn &<br>Wrong Surface |
| 404 | | | WoffW | | | | PE:<br>dc - Enter Non-Surface area | PI-PC<br>s>=40kn<br>Wrong surface |
| 406 | | | dc | | | | | |
| 408 | | | GOAROUND | | | | | PI-PC WonW &<br>s>40kn &<br>Wrong Surface |
| 410 | | | | | | | PE:<br>dc - Enter Non-Surface area | dc PI-PC<br>s>=0kn &<br>Wrong Surface |
| 412 | Cross Rwy Border | | | | | | PE:<br>dc - Enter Non-Surface area | dc PI-PC<br>s>=0kn &<br>Wrong Surface |
| 414 | | | | | | | | dc PI-PC<br>s>=0kn &<br>Wrong Surface |
| 416 | s>0 & <=40kn | | | | | | PE:<br>dc - Enter Non-Surface area | dc PI-PC<br>s>=0kn &<br>Wrong Surface |
| 418 | | s<=40kn | | | s=0kn | ARRIVE GATE | dc - Enter Non-Surface area | dc<br>s>=0kn &<br>Wrong Surface |
| 420 | | | dc | | | | | |
| 422 | Cross Hold Line | s>0 & <=40kn | | s=0kn | | | | dc<br>s=0 & Wrong surface |
| 424 | | s>0 & <=40kn | | | s=0 | | | dc<br>s=0 & Wrong surface |
| 426 | | | | | | dc | | |
| 428 | | | | | | | | |

500

| | 528 | 530 | 532 | 534 | 536 | 538 | 540 | 542 | 544 | 546 | 548 | 550 | 552 | |
|---|---|---|---|---|---|---|---|---|---|---|---|---|---|---|
| Target state | Approach (1) | Final App (2) | Landed (3) | Taxiing on RWY (4) | Stopped RWY (5) | Departing (6) | Taxi Non-Adj TWY (7) | Taxi Adj TWY (8) | Ent/Cross RWY (9) | In Flight (10) | Stopped on Adj TWY (11) | Stopped on non-adj TWY (12) | Gate | |
| Own ship Current state | | | | | | | | | | | | | | |
| Approach (1) | dc - MC | dc - MC | | | | | | | | | | | | 502 |
| Final App (2) | dc - MC | dc - MC | PI-X | PI-X | PI-X | PI-X | | | PI-X | | | | | 504 |
| Landed (3) | | | PI-X | PI-X | PI-X | PI-X | dc X | dc X | PI-X | | dc X | dc X | | 506 |
| Taxiing on RWY (4) | | PI-X | PI-X | PI-X | PI-X | PI-X | | | PI-X | | | | | 508 |
| Stopped RWY (5) | dc | PI-X | PI-X | PI-X | | PI-X | | | PI-X | | | | | 510 |
| Departing (6) | dc | PI-X | PI-X | PI-X | PI-X | PI-X | | | PI-X | | | | | 512 |
| Taxi Non-Adj TWY (7) | | | dc X | | | | dc X | | | | | dc X | | 514 |
| Taxi Adj TWY (8) | | | dc X | | | | | dc X | | | dc X | | | 516 |
| Ent/Cross RWY (9) | | PI-X | PI-X | PI-X | PI-X | PI-X | | | PI-X | | | | | 518 |
| In Flight (10) | | | | | | | | | | dc | | | | 520 |
| Stopped on Adj TWY (11) | | | dc X | | | | | dc X | | | | | | 522 |
| Stopped on non-adj TWY (12) | | | dc X | | | | dc X | | | | | | | 524 |
| Gate | | | | | | | | | | | | | | 526 |

FIG. 5

PREDICTIVE RELEVANT TRAFFIC DETERMINATION USING VEHICLE STATES DESCRIPTIONS

BACKGROUND INFORMATION

1. Field

The present disclosure relates generally to vehicles and, in particular, to a method and apparatus for identifying vehicles. Still more particularly, the present disclosure relates to a method and apparatus for identifying sets of vehicles for analysis.

2. Background

Traffic, such as aircraft, ships, and/or other vehicles often require guidance and direction to avoid undesired situations. For example, with aircraft, air traffic control services are provided by controllers that direct aircraft on the ground and in the air. Air traffic controllers provide directions to aircraft to prevent undesired situations from happening between aircraft. These undesired situations may include, for example, without limitation, two aircraft having less than a desired amount of separation between the aircraft, an aircraft entering an empty or occupied runway when authorization has not been given, and/or other undesired situations.

In addition, the flight crew of an aircraft make assessments about traffic the flight crew may perceive while onboard the aircraft. For example, the flight crew may assess traffic observed through aircraft windows or detected by onboard aircraft systems. The flight crew is responsible for the safety of the aircraft.

Movement of an aircraft during departure, flight, and approach phases may be managed by one or more ground-based facilities and/or the flight crew. Currently, the amount of space separating aircraft traffic is determined by the location of the aircraft and estimates made by human air traffic controllers and/or the flight crew based on the direction and flight paths of those aircraft in the traffic.

Around an airport, air traffic controllers give directions to aircraft to avoid undesired situations. Controlling the movement of aircraft traffic is a labor-intensive process that requires air traffic controllers to observe the air traffic, analyze the air traffic, and provide instructions to the aircraft. These types of operations require highly trained personnel to properly control air traffic. Further, the flight crew of an aircraft uses the directions and/or information provided by the air traffic controllers to maneuver the aircraft. The flight crew uses these directions and/or information in addition to the flight crew's assessment of the situation of the aircraft. In this manner, the flight crew may make the final decisions to avoid undesired traffic situations.

Thus, it would be advantageous to have a method and apparatus that takes into account one or more of the issues discussed above.

SUMMARY

In one advantageous embodiment, a method is present for predicting relevant traffic for analyzing runway incursions. A state for each of a plurality of aircraft is identified to form a plurality of identified states. A set of aircraft is identified from the plurality of aircraft based on the plurality of identified states to form a set of identified aircraft. A number of potential runway incursions can be predicted using the set of identified aircraft.

In another advantageous embodiment, a method is present for identifying sets of vehicles. A state for each of a plurality of vehicles is identified to form a plurality of identified states. A set of vehicles is identified from the plurality of vehicles based on the plurality of identified states. The set of vehicles forms a set of relevant vehicles.

In yet another advantageous embodiment, a data processing system comprises a bus, a communications unit connected to the bus, a storage device, and a processor unit. The storage device is connected to the bus and includes program code. The processor unit is also connected to the bus. The processor unit executes the program code to identify a state for each of a plurality of aircraft to form a plurality of identified states. The processor unit executes the program code to identify a set of aircraft from the plurality of aircraft based on the plurality of identified states to form a set of identified aircraft. The processor unit further executes the program code to predict a number of potential runway incursions using the set of identified aircraft.

In another advantageous embodiment, a computer program product is present for predicting runway incursions. The computer program product comprises a computer recordable storage medium and program code. The program code is stored on the computer recordable storage medium. Program code is present for identifying a state for each of a plurality of aircraft to form a plurality of identified states. Program code is present for identifying a set of aircraft from the plurality of aircraft based on the plurality of identified states to form a set of identified aircraft. Program code is also present for predicting a number of potential runway incursions using the set of identified aircraft.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIGS. 4A and 4B are a diagram of a vehicle state table in accordance with an illustrative embodiment;

FIG. 5 is a diagram of a dynamic relevant traffic state table in accordance with an advantageous embodiment;

DETAILED DESCRIPTION

Figure 1:
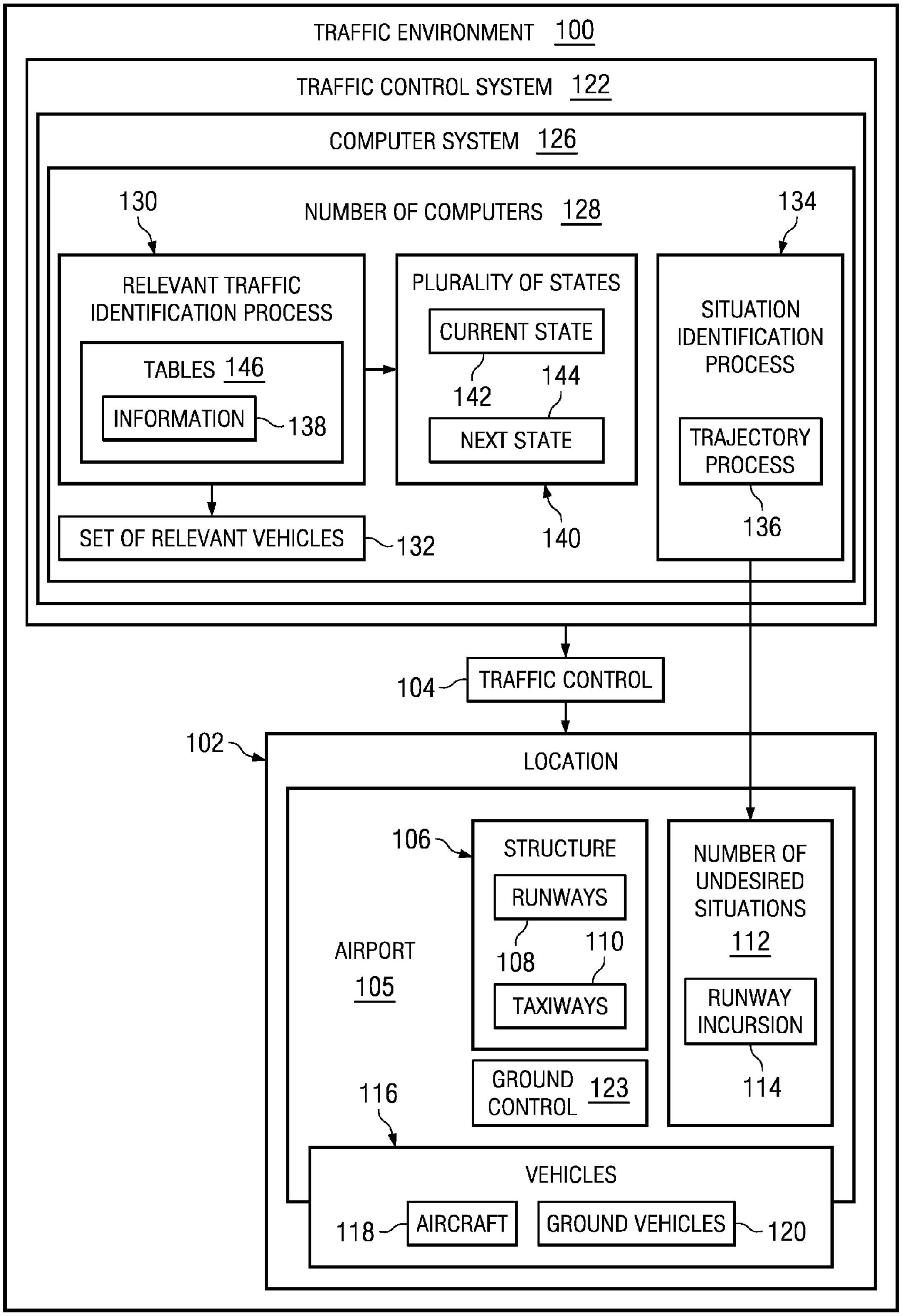
FIG. 1 is a diagram of a traffic environment in accordance with an advantageous embodiment.

The different advantageous embodiments recognize and take into account a number of considerations. A number, as used herein, refers to one or more items. For example, a number of considerations is one or more considerations. As one example, the different advantageous embodiments recognize that the control of traffic, such as air traffic, may be augmented or supplemented through the use of computer systems that predict the potential for undesired situations. These undesired situations may include, for example, separations that are too small, potential runway incursions around an airport, and/or other undesired situations.

Computers may be used to predict trajectories for every aircraft on the ground or around an airport. These trajectories may be used to determine or predict whether undesired situations may occur. These computers may be located at ground control stations, in aircraft, and/or at other locations.

The different advantageous embodiments also recognize that predicting the trajectory of all aircraft at an airport may require large amounts of processing resources. These processing resources may be present in computer systems for ground systems, such as those used by air traffic controllers. However, the computer systems in aircraft may not have sufficient processing power to provide an identification of undesired situations. The different advantageous embodiments recognize that some solutions may involve relying on ground air traffic controllers or replacing computer systems on an aircraft with systems that have greater processing resources.

The different advantageous embodiments recognize and take into account that relying solely on air traffic controllers may not provide indications of undesired situations as quickly as may be desired by the crew of an aircraft. Further, the different advantageous embodiments also recognize and take into account that refurbishing or replacing current computer systems on aircraft with newer computer systems may be expensive and time consuming. These upgrades also may take aircraft out of service for a period of time that may reduce the revenues that a carrier may be able to generate from the aircraft.

Thus, the different advantageous embodiments provide a method and apparatus for identifying traffic. A state for each of a plurality of aircraft is identified to form a plurality of identified states. A set of aircraft from the plurality of aircraft is identified based on the plurality of identified states to form a set of identified aircraft. A set, as used herein, refers to a mathematical set. For example, a set of identified aircraft may be zero aircraft, one aircraft, ten aircraft, or some other number of aircraft.

With the set of identified aircraft, a number of potential runway incursions or other undesired situations may be predicted using the set of identified aircraft. By reducing the number of aircraft that may be analyzed, less processing power is needed to predict the trajectories of the set of aircraft as compared to all of the plurality of aircraft.

In this manner, one or more of the different advantageous embodiments may be used to predict relevant traffic for analyzing runway incursions. The traffic identified may be a subset of all traffic that could potentially be involved in one or more runway incursions. In this manner, the amount of traffic analyzed may be reduced.

With reference now to the figures and in particular, with reference to FIG. 1, a diagram of a traffic environment is depicted in accordance with an advantageous embodiment. Traffic environment 100 is an example of an environment in which a number of advantageous embodiments may be implemented.

In this illustrative example, location 102 in traffic environment 100 may be a location in which traffic control 104 may be desired. Location 102, in this illustrative example, is airport 105. Of course, location 102 may take other forms. For example, without limitation, location 102 may be a harbor, a train depot, and/or some other suitable type of location where vehicles are present.

In this illustrative example, airport 105 includes structure 106. Structure 106 may be, for example, without limitation, runways 108, taxiways 110, and/or other suitable features.

The movement and/or location of vehicles 116 within and around airport 105 may result in number of undesired situations 112 occurring. In these illustrative examples, vehicles 116 may include, for example, without limitation, at least one of aircraft 118, ground vehicles 120, and/or other suitable types of vehicles.

As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

Traffic control 104 may be performed to avoid number of undesired situations 112 at airport 105. An example of an undesired situation in number of undesired situations 112 may include runway incursion 114 on runways 108. In these examples, runway incursion 114 may be present any time an aircraft enters a runway without authorization. For example, without limitation, runway incursion 114 is present when an aircraft enters a runway without authorization even if no other vehicles are present on the runway.

In these illustrative examples, number of undesired situations 112 may be avoided by performing traffic control 104 through the use of traffic control system 122. Traffic control system 122 may be implemented in a number of different locations within traffic environment 100. For example, traffic control system 122 may be implemented in ground control 123, in aircraft 118, and/or in other suitable locations.

As depicted, traffic control system 122 includes computer system 126. Computer system 126 comprises number of computers 128. In these illustrative examples, relevant traffic identification process 130 executes on number of computers 128 in traffic control system 122. For example, relevant traffic identification process 130 may be configured to execute on any number of number of computers 128.

Relevant traffic identification process 130 identifies set of relevant vehicles 132 from vehicles 116. Set of relevant vehicles 132 may be, for example, without limitation, zero vehicles, one vehicle, ten vehicles, or some other number of vehicles. Set of relevant vehicles 132 may then be used by situation identification process 134 to identify number of undesired situations 112.

In these illustrative examples, relevant traffic identification process 130 reduces the amount of resources needed by situation identification process 134 to identify number of undesired situations 112. For example, situation identification process 134 may include trajectory process 136. The amount of processing resources needed by trajectory process 136 to project trajectories for all of vehicles 116 may require an amount of resources from computer system 126 that may result in other operations being given a low priority or taking longer to process.

Further, in some advantageous embodiments, when portions of computer system 126 are present in vehicles 116, those portions of computer system 126 may not have the needed processing power to execute situation identification process 134.

With set of relevant vehicles 132, the amount of processing resources may be reduced to a level that allows for vehicles 116, such as aircraft 118, to execute situation identification process 134 with trajectory process 136. As a result, upgrades or replacement of computer systems on vehicles 116 may be avoided.

In these illustrative examples, relevant traffic identification process 130 uses information 138 to identify plurality of states 140 for vehicles 116. In other words, a state is identified for each vehicle in vehicles 116 to form plurality of states 140. Plurality of states 140 may include, for example, without limitation, current state 142 and next state 144. Current state 142 may be a current state of a vehicle within vehicles 116. Next state 144 may be the next predicted state for the vehicle from current state 142. Any number of next states, in addition to next state 144, may be identified.

Information 138 may be received directly from vehicles 116 and/or from other sources. These sources may include, for example, without limitation, radar systems on the ground, visual observations, and other suitable sources. Information 138 may be stored as tables 146, in some advantageous embodiments.

In this manner, one or more of the different advantageous embodiments provides a capability to reduce the amount of processing resources needed to predict whether number of undesired situations 112 may be present. The different advantageous embodiments provide a capability to identify these situations without having to predict the trajectory of all of vehicles 116. Instead, a subset of vehicles 116 in the form of set of relevant vehicles 132 is identified.

With one or more of the different advantageous embodiments, relevant traffic identification process 130 may be used on one or more of number of computers 128 in vehicles 116 that could not be used if all of vehicles 116 were processed. Further, the amount of time needed to identify number of undesired situations 112 also may be reduced even when a computer within number of computers 128 has sufficient processing resources to execute trajectory process 136 for all of vehicles 116.

The illustration of traffic environment 100 in FIG. 1 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, relevant traffic identification process 130 may be located only in some of number of computers 128. In yet other advantageous embodiments, situation identification process 134 may not be present within traffic control system 122. In still other advantageous embodiments, relevant traffic identification process 130 may identify set of relevant vehicles 132 from vehicles 116 that are homogeneous or heterogeneous. In other words, vehicles 116 may include different types of vehicles or all of the same types of vehicles, depending on the particular implementation.

In still other advantageous embodiments, information 138 may be stored in structures other than tables 146. Further, tables 146 may be stored individually or integrated as part of a database.

Figure 2:
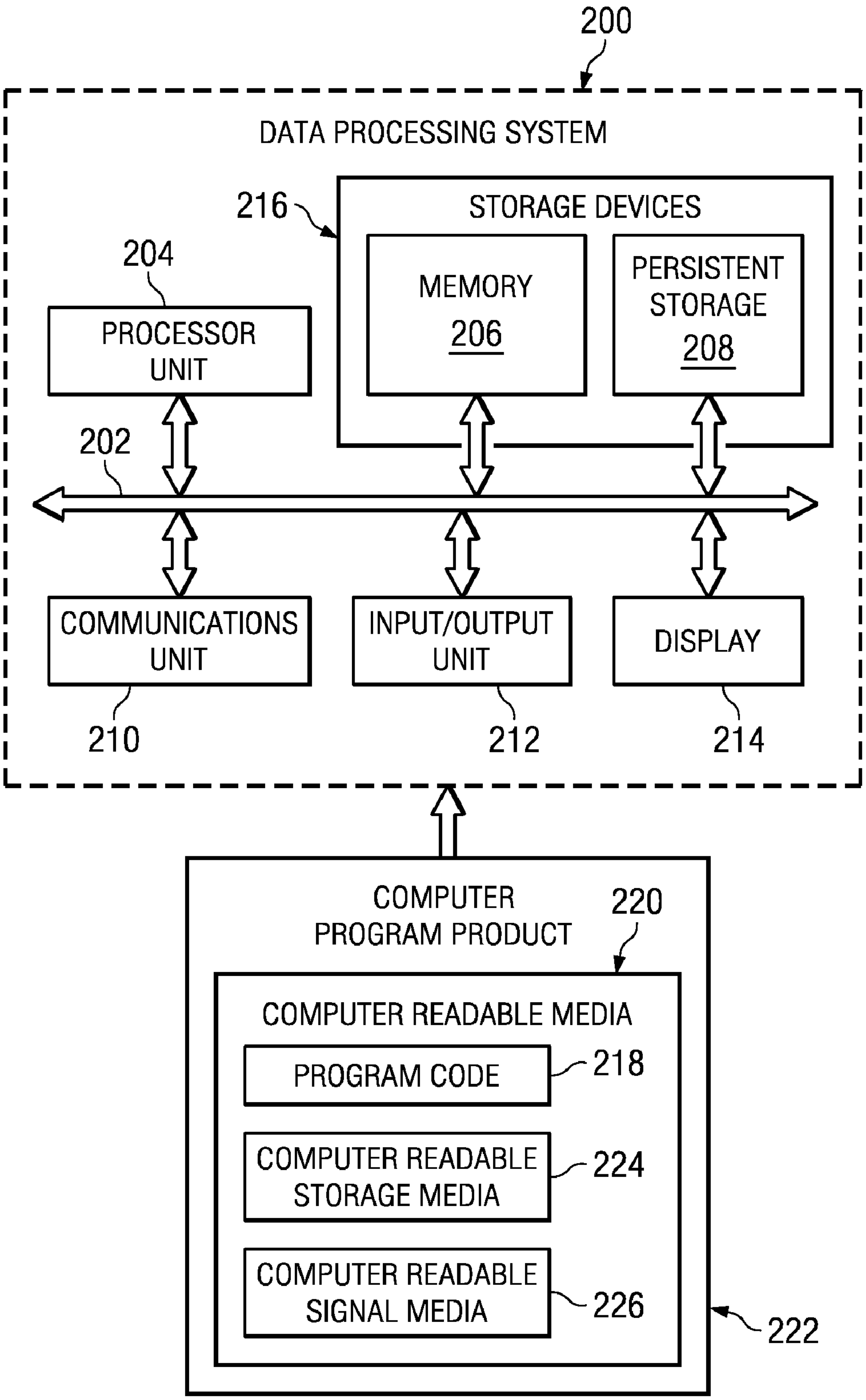
FIG. 2 is a block diagram of a data processing system in accordance with an advantageous embodiment.

Turning now to FIG. 2, a block diagram of a data processing system is depicted in accordance with an advantageous embodiment. Data processing system 200 is an example of a data processing system that may be used to implement server and client computers. Further, data processing system 200 is an example of a data processing system that may be implemented in one or more computers within number of computers 128 in computer system 126.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information such as, for example, without limitation, data, program code in functional form, and/or other suitable information either on a temporary basis and/or a permanent basis. Memory 206, in these examples, may be, for example, a random access memory or any other suitable volatile or non-volatile storage device.

Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226.

Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
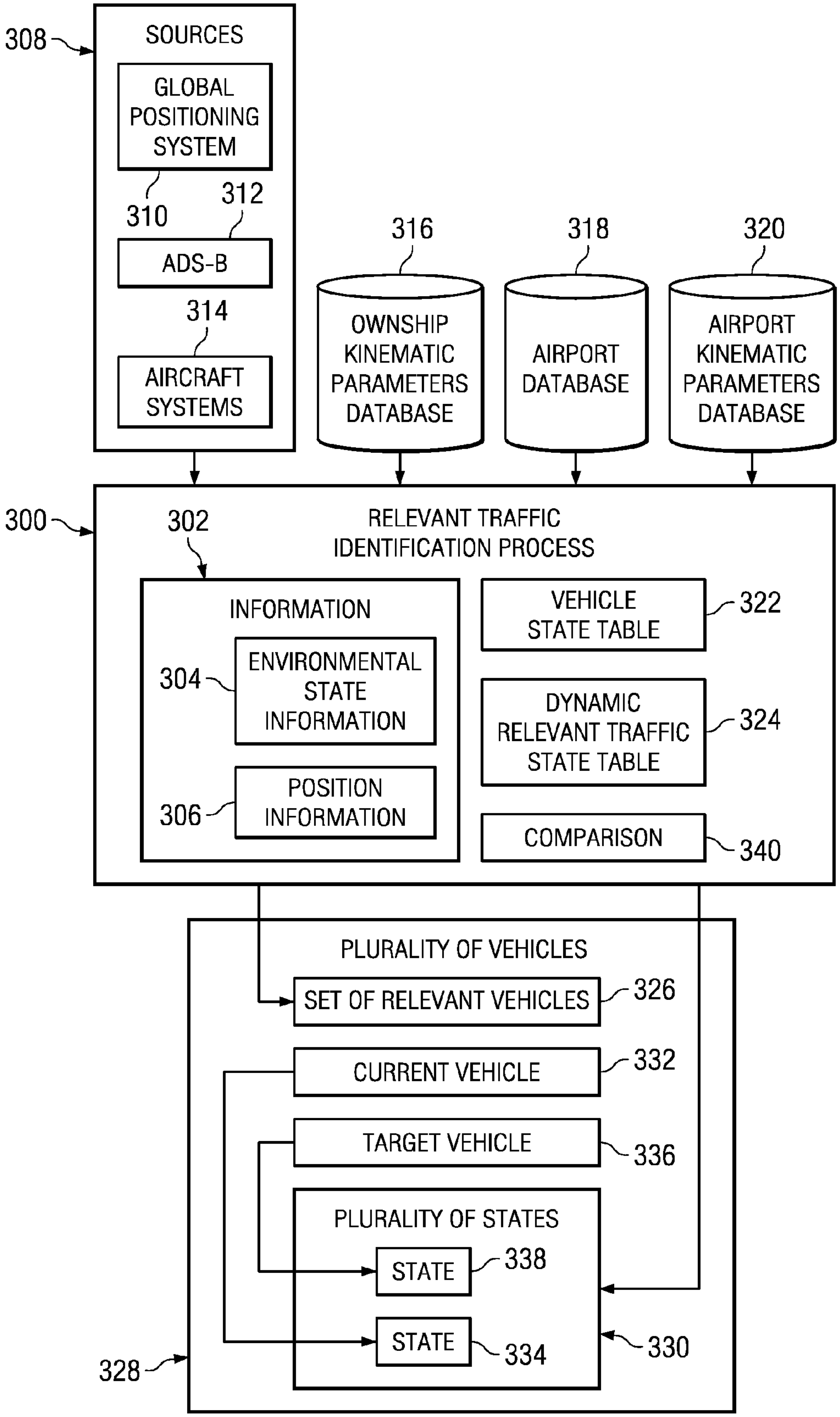
FIG. 3 is an illustration of a relevant traffic identification process in accordance with an advantageous embodiment.

With reference now to FIG. 3, an illustration of a relevant traffic identification process is depicted in accordance with an advantageous embodiment. In this illustrative example, relevant traffic identification process 300 is an example of one implementation for relevant traffic identification process 130 in FIG. 1. In this illustrative example, a more detailed illustration of the data flow used to identify relevant traffic is presented.

In this illustrative example, information 302 is received by relevant traffic identification process 300. Information 302 may include, for example, environmental state information 304, position information 306, and/or other types of information.

Environmental state information 304 may be, for example, information about a vehicle. For example, environmental information 304 may be an indication as to whether a weight of an aircraft is on the wheels, a configuration of flight control surfaces for the aircraft, a speed of the aircraft, and/or other suitable information about the aircraft.

Position information 306 may be a location of the vehicle in three-dimensional space. Position information 306 may be in terms of latitude, longitude, and altitude. In other advantageous embodiments, position information 306 may be in any type of coordinate system suitable for use.

Information 302 is obtained from sources 308 in these examples. These sources may include global positioning system 310, automatic dependent surveillance-broadcast (ADS-B) 312, aircraft systems 314, and/or other suitable sources of information.

Relevant traffic identification process 300 also has access to ownership kinematic parameters database 316, airport database 318, and aircraft kinematic parameters database 320. Airport database 318 contains information about the different structures at the airport. This information may be used to identify the states of the aircraft from information 302.

Relevant traffic identification process 300 uses vehicle state table 322 to identify states for vehicles. Vehicle state table 322 provides a table that is configured to identify possible states for a vehicle using information 302. These states may include a current state, as well as predicted future states. These predicted future states may include a next state and/or any number of states after the next state.

Relevant traffic identification process 300 builds or generates dynamic relevant traffic state table 324 based on the states identified using vehicle state table 322. Dynamic relevant traffic state table 324 is an example of a table within tables 146 in FIG. 1. Using dynamic relevant traffic state table 324, relevant traffic identification process 300 identifies set of relevant vehicles 326 from plurality of vehicles 328. Set of relevant vehicles 328, in this example, contains pairs of vehicles.

As an illustrative example, relevant traffic identification process 300 identifies plurality of states 330 for plurality of vehicles 328. Each vehicle in plurality of vehicles 328 may have more than one state identified for the vehicle. These states may include, for example, without limitation, a current state and any number of subsequent states that may occur after the current state. If multiple states are identified, these are states that are predicted to occur sequentially in this particular example.

As an example, current vehicle 332 from plurality of vehicles 328 may be selected for analysis. State 334 for current vehicle 332 is identified. Target vehicle 336 is identified from other vehicles within plurality of vehicles 328. State 338 is identified for target vehicle 336. State 334 and state 338 are identified using information 302 and vehicle state table 322 in this illustrative example. State 334 is compared to state 338 using dynamic relevant traffic state table 324. Comparison

340 of state 334 and state 338 is used to determine whether current vehicle 332 and target vehicle 336 should be part of set of relevant vehicles 326.

Each time current vehicle 332 and target vehicle 336 are identified as vehicles for set of relevant vehicles 326, that pair of vehicles is placed into the set. The vehicles may be placed in the set through identifiers for the vehicles in these illustrative examples. These identifiers may be, for example, without limitation, tail numbers, carrier and flight numbers, and/or other suitable identifiers.

Next, another vehicle from plurality of vehicles 328 is selected to be target vehicle 336. A similar identification of states and comparisons is made to determine whether current vehicle 332 and target vehicle 336 should be included in set of relevant vehicles 326. This type of selection for target vehicle 336 is made until all vehicles in plurality of vehicles 328 have been compared to current vehicle 332.

Then, another vehicle that has not been used as current vehicle 332 is selected from plurality of vehicles 328. Thereafter, target vehicle 336 is selected from other vehicles within plurality of vehicles 328. This type of process is repeated until all of the vehicles within plurality of vehicles 328 have been compared.

Additionally, relevant traffic identification process 300 may prioritize set of relevant vehicles 326. The priority of vehicles within the set may be based on various parameters. For example, the vehicle pairs identified in set of relevant vehicles 326 may be ranked based on time, distance, type of aircraft, speed of aircraft, operator, and/or other suitable parameters. Further, set of relevant vehicles 326 may be pruned or reduced in size by selecting a first number of sets after ranking has been performed in these examples.

The illustration of relevant traffic identification process 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, other types of vehicles in addition to aircraft may be compared to each other. In yet other advantageous embodiments, relevant traffic identification process 300 may be applied to identify set of relevant vehicles 326 for other types of vehicles other than aircraft. For example, plurality of vehicles 328 may include surface ships, submarines, trucks, and/or other suitable types of vehicles.

Turning now to FIGS. 4A and 4B, diagrams of a vehicle state table is depicted in accordance with an illustrative embodiment. In this illustrative example, vehicle state table 400 is an example of one implementation for vehicle state table 322 in FIG. 3. In this illustrative example, vehicle state table 400 has rows 402, 404, 406, 408, 410, 412, 414, 416, 418, 420, 422, 424, 426, and 428 and columns 430, 432, 434, 436, 438, 440, 442, 444, 446, 448, 450, 452, 454, 456, and 458. In this example, the rows represent the current state of the vehicle, while the columns represent a next state based on information about the vehicle in the current state. This next state is a predicted state in these examples.

Vehicle state table 400 may be used to identify a series of next states. For example, a next state may be identified from the current state using table 400. Thereafter, a subsequent next state may be identified from that next state. This process may be continued for any number of states desired for analysis.

In this particular example, the vehicle is an aircraft. This table may be adapted or changed for other types of vehicles, depending on the particular implementations. As depicted, row 402 represents an aircraft on an adjacent taxiway state, row 404 represents a departing state, row 406 represents an approach state, row 408 represents a final approach state, row 410 represents a landed state, row 412 represents a taxiing on a runway state, and row 414 represents a stopped on a runway state.

Row 416 represents an entering or crossing a runway state, row 418 represents a taxiing on a non-adjacent taxiway, row 420 represents an in-flight state, row 422 represents a stopped on a non-adjacent taxiway state, row 424 represents a stopped on a non-adjacent taxiway state, row 426 represents an at a gate state, and row 428 represents an off-surface excursion state.

The columns represent states that may occur, depending on conditions found in the different rows. In these examples, column 430 represents a taxiing on an adjacent taxiway state, column 432 represents a departing state, column 434 represents an approach state, and column 436 represents a final approach state. Column 438 represents a landed state, column 440 represents a taxiing on a runway state, column 442 represents a stopped on a runway state, column 444 represents an entering or crossing runway state, and column 446 represents a taxiing on a non-adjacent taxiway state.

Column 448 represents an in-flight state, column 450 represents a stopped on an adjacent taxiway state, and column 452 represents a stopped on a non-adjacent taxiway state. Column 454 represents an at a gate state, column 456 represents an off-surface excursion state, and column 458 represents a wrong surface confusion state.

Conditions are found within some of the entries in table 400. When a condition is present in an entry between a row and a column, the condition indicates that the state identified in the row may change into the state identified by the column if the condition is met. For example, in row 402, if the aircraft has arrived at a gate, the state may change from a taxiing on an adjacent taxiway state, as identified in row 402, to an at a gate state, as identified in column 454.

Turning now to FIG. 5, a diagram of a dynamic relevant traffic state table is depicted in accordance with an advantageous embodiment. Dynamic relevant traffic state table 500 is an example of one implementation for dynamic relevant traffic state table 324 in FIG. 3.

In this particular example, dynamic relevant traffic state table 500 has rows 502, 504, 506, 508, 510, 512, 514, 516, 518, 520, 522, 524, and 526 and columns 528, 530, 532, 534, 536, 538, 540, 542, 544, 546, 548, 550, and 552. The rows represent the current state of an aircraft. The columns represent the current state of a target aircraft. The state of the current aircraft is compared to the state of the target aircraft to determine whether the current aircraft and the target aircraft should be part of a set of relevant vehicles. The states may be a current state or a next predicted state for the current aircraft and the target aircraft.

In this depicted example, row 502 represents an approach state, row 504 represents a final approach state, and row 506 represents a landed state. Row 508 represents a taxiing on runway state, row 510 is a stopped on runway state, row 512 is a departing state, and row 514 is a taxiing on a non-adjacent taxiway state. Row 516 represents a taxiing on an adjacent taxiway state, row 518 represents an entering or crossing runway state, row 520 represents an in-flight state, and row 522 represents a stopped on an adjacent taxiway state. Row 524 represents a stopped on a non-adjacent taxiway state, and row 526 represents an at a gate state.

Column 528 represents an approach state, column 530 represents a final approach state, and column 532 represents a landed state. Column 534 represents a taxiing on a runway state, column 536 represents a stopped state, and column 538 represents a departing state. Column 540 represents a taxiing on a non-adjacent taxiway state, column 542 represents a taxiing on an adjacent taxiway state, column 544 represents an entering and crossing runway state, column 546 represents an in-flight state. Column 548 represents a stopped on an adjacent taxiway state, column 550 represents a stopped on a non-adjacent taxiway state, and column 552 represents an at a gate state.

The current state of the current aircraft is compared with the current state of the target aircraft. A result in the table indicates whether the aircraft should be included in the set of relevant vehicles. If an entry is absent, then the vehicles are not included in the set of relevant vehicles.

The illustration of vehicle state table 400 in FIGS. 4A and 4B and dynamic relevant traffic state table 500 in FIG. 5 are not meant to imply limitations to the manner in which these state tables may be implemented for different advantageous embodiments. For example, additional states or fewer states may be included. Further, the conditions used to identify net states or predict net states from information about the current state of an aircraft may change, depending on the particular implementation. Further, in some cases where one state cannot change to another state, a condition may be added to allow that predicted change, depending on the particular situation.

Figure 6:
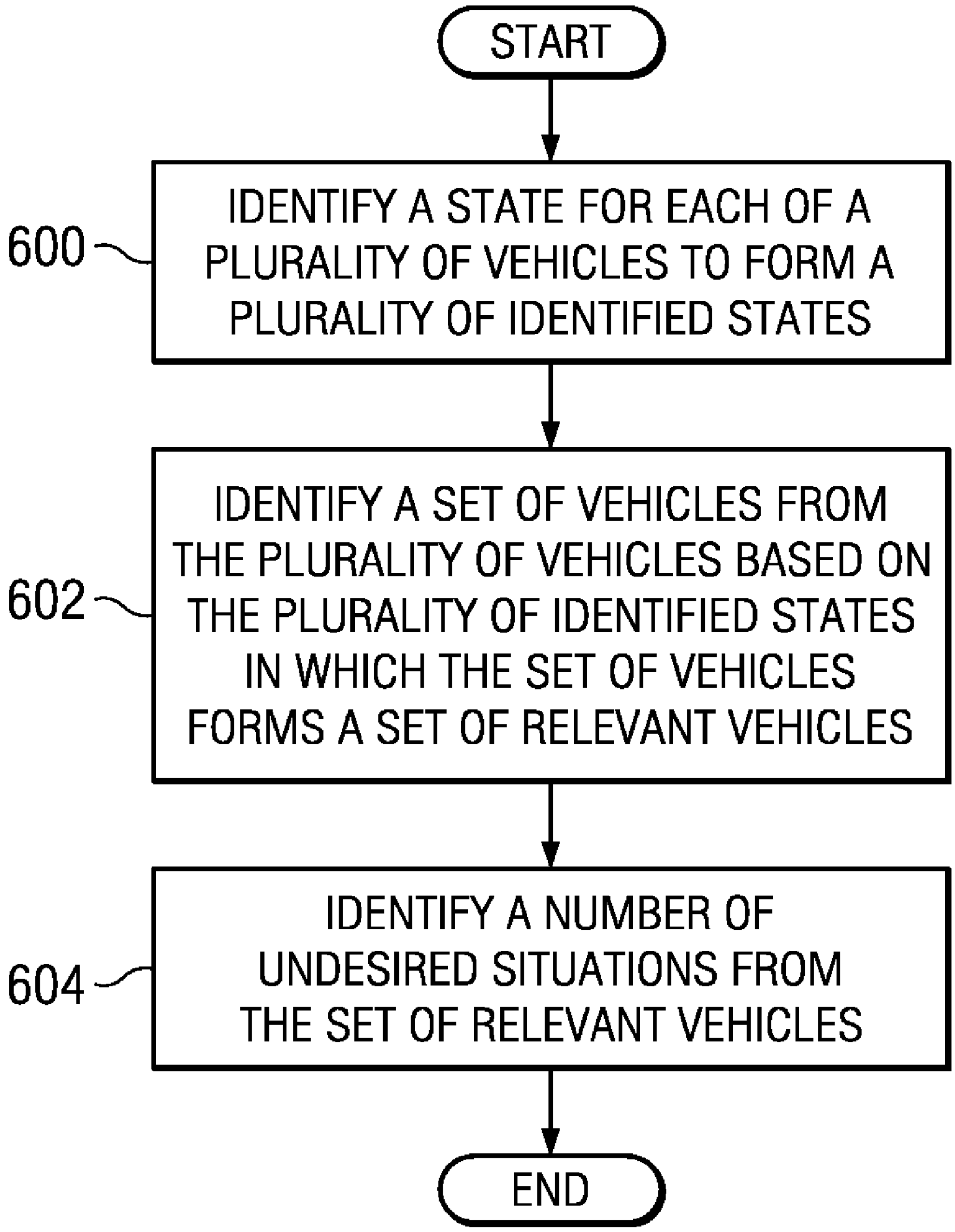
FIG. 6 is a flowchart of a process for identifying sets of vehicles in accordance with an advantageous embodiment.

With reference now to FIG. 6, a flowchart of a process for identifying sets of vehicles is depicted in accordance with an advantageous embodiment. The process illustrated in FIG. 6 may be implemented in traffic environment 100 in FIG. 1. In particular, the process may be implemented in relevant traffic identification process 130 in FIG. 1.

The process begins by identifying a state for each of a plurality of vehicles to form a plurality of identified states (operation 600). The process then identifies a set of vehicles from the plurality of vehicles based on the plurality of identified states in which the set of vehicles forms a set of relevant vehicles (operation 602).

This set of vehicles may be a null set, depending on the states for the vehicles. Of course, any number of vehicles from the vehicles may be present within the set of vehicles. A number of undesired situations are identified from the set of relevant vehicles (operation 604), with the process terminating thereafter. These undesired situations may be identified by predicting the trajectory or movement of the vehicles in the set.

Figure 7:
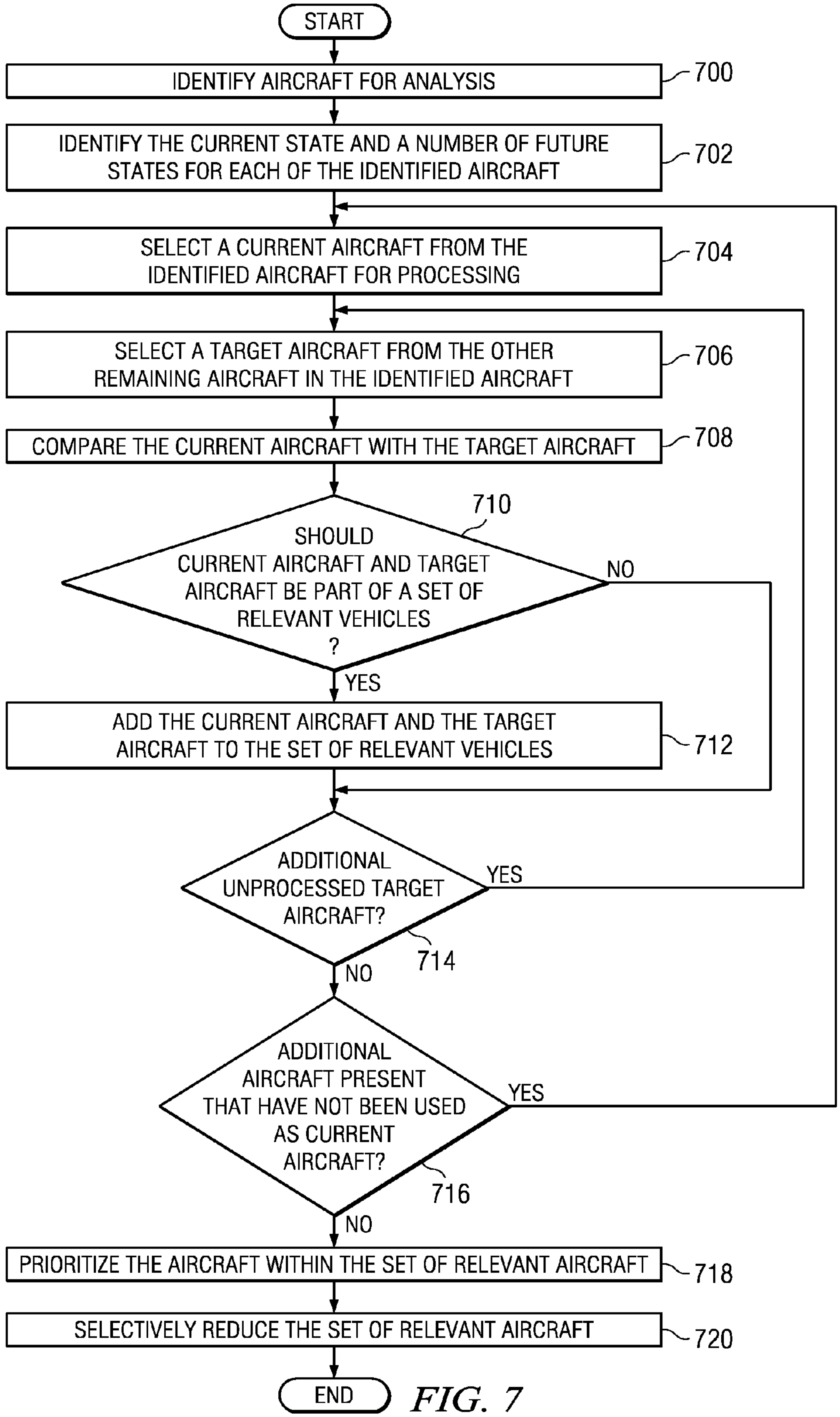
FIG. 7 is a flowchart of a process for identifying a set of aircraft in accordance with an advantageous embodiment.

Turning next to FIG. 7, a flowchart of a process for identifying a set of aircraft is depicted in accordance with an advantageous embodiment. The process illustrated in FIG. 7 is an example of one implementation of relevant traffic identification process 300 for an aircraft.

The process begins by identifying aircraft for analysis (operation 700). The aircraft may be, for example, aircraft that are at an airport or within some selected distance of the airport. The process then identifies the current state and/or a number of future states for each of the identified aircraft (operation 702). These states are identified from information received from the aircraft. The number of future states may include a next state and/or any number of states after the next state. A next state for the aircraft may be identified in operation 702 using vehicle state table 400 in FIGS. 4A and 4B.

The process then selects a current aircraft from the identified aircraft for processing (operation 704). In these examples, a current aircraft is the aircraft from which comparisons will be made to all other aircraft that have been identified. The process also selects a target aircraft from the other remaining aircraft in the identified aircraft (operation 706).

A comparison of the current aircraft is made with the target aircraft (operation 708). This comparison may be based on the current state and/or the number of future states for the current aircraft and the target aircraft identified in operation 702. Further, operation 708 may be implemented using a table, such as dynamic relevant traffic state table 500 in FIG. 5.

A determination is made as to whether the current aircraft and the target aircraft should be part of a set of relevant vehicles (operation 710). This determination is made based on the comparison from operation 708 in these examples. If the two aircraft should be part of the set of relevant vehicles, the two aircraft are added to the set of relevant vehicles (operation 712). In these illustrative examples, the set of relevant vehicles contains a list of vehicle pairs.

A determination is then made as to whether additional unprocessed target aircraft are still present (operation 714). If additional unprocessed target aircraft are present, the process returns to operation 706 to identify another target aircraft for comparison with the current aircraft. If additional unprocessed target aircraft are not present, a determination is made as to whether additional aircraft are present that have not been used as the current aircraft (operation 716). If additional unprocessed aircraft are present for use as a current aircraft, the process returns to operation 704 to select another current aircraft.

Otherwise, the process prioritizes the aircraft within the set of relevant aircraft (operation 718). The prioritization of the aircraft within the set of relevant aircraft is an ordering or ranking of aircraft pairs. The prioritization of aircraft within the set of relevant aircraft may be performed using a number of different parameters. These parameters may be, for example, without limitation, type of aircraft, distance, time, speed of aircraft, state of aircraft, and/or other suitable parameters.

Next, the process selectively reduces the set of relevant aircraft (operation 720). This operation may be performed to reduce the size of the set of relevant aircraft. For example, the first ten pairs of aircraft may be selected for use while other aircraft are discarded from the set of relevant aircraft. Of course, any number of aircraft may be selected for the set, depending on the particular implementation. The process terminates thereafter.

With reference again to operation 710, if the aircraft are not to be included in the set of relevant aircraft, the process proceeds to operation 714 as described above.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

For example, operation 718 and operation 720 may be omitted, depending on the particular implementation. In yet other advantageous embodiments, the process illustrated in FIG. 7 may be repeated for any number of series of states for the identified aircraft. With this type of implementation, a set of relevant aircraft for each state that is analyzed.

Thus, the different advantageous embodiments provide a method and apparatus for identifying a set of vehicles for use in managing traffic. In the different advantageous embodiments, a state for each of the plurality of vehicles is identified to form a plurality of identified states. A set of vehicles is identified from the plurality of vehicles based on the plurality of identified states. This set of vehicles forms a set of relevant vehicles.

With one or more of the different advantageous embodiments, the amount of processing resources needed to manage traffic may be reduced. For example, when a set of vehicles are identified from a larger set of vehicles, the amount of processing needed to project or predict trajectories for the vehicles is reduced. Further, with the reduction in the amount of processing resources needed, traffic management processes and systems may be implemented in vehicles that may have computers that have lower amounts of resources available for processing data.

With one or more of the different advantageous embodiments, an identification of vehicles may be made for identifying undesired situations, such as runway incursion detection situations. Further, with one or more of the different advantageous embodiments, processes for identifying undesired situations may be applied to traffic anywhere in a location, such as an airport. For example, detection of traffic on airport surfaces, such as runways, taxiways, aprons, gates, and/or other locations may be made for use in collision detection, capacity determination, visual depiction, situation awareness, and other types of purposes.

The description of the different advantageous embodiments has been presented for purposes of illustration and description, and is not intended to be exhaustive or limited to the embodiments in the form disclosed. Many modifications and variations will be apparent to those of ordinary skill in the art.

For example, although the illustrative examples have been described with respect to aircraft, one or more of the different advantageous embodiments may be applied to any type of vehicle in which traffic management or other analysis is needed. For example, the different advantageous embodiments may be applied to vehicles selected from at least one of ground vehicles, spacecraft, surface ships, submarines, and other suitable vehicles in addition to aircraft.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for predicting relevant traffic for analyzing runway incursions, the method comprising:

identifying a state for each of a plurality of aircraft using a state definition to form a plurality of identified states;

identifying a set of aircraft from the plurality of aircraft based on the plurality of identified states to form a set of identified aircraft; and predicting a number of potential runway incursions using the set of identified aircraft.

2. The method of claim 1, wherein the step of identifying the set of aircraft from the plurality of aircraft based on the plurality of identified states to form the set of identified aircraft comprises:

identifying the set of aircraft from the plurality of aircraft based on the plurality of identified states to form the set of identified aircraft using a state machine.

3. The method of claim 1, wherein the state definition comprises a table comprising a plurality of states and conditions for the plurality of states.

4. The method of claim 1, wherein the step of identifying the set of aircraft from the plurality of aircraft based on the plurality of identified states to form the set of identified aircraft comprises:

selecting an aircraft from the plurality of aircraft to form a selected aircraft;

comparing a first state of the selected aircraft with a second state for a second aircraft in the plurality of aircraft to form a comparison; and determining whether to identify the second aircraft as being part of the set of identified aircraft from the comparison.

5. The method of claim 4, wherein the comparing step is performed using a dynamic relevant traffic state table.

6. The method of claim 1, wherein the step of identifying the set of aircraft from the plurality of aircraft based on the plurality of identified states to form the set of identified aircraft comprises:

comparing a state of each aircraft from the plurality of aircraft with a state of all other aircraft in the plurality of aircraft to form a number of comparisons; and identifying the set of aircraft using the number of comparisons to form the set of identified aircraft.

7. The method of claim 1, wherein the step of identifying the state for each of the plurality of aircraft to form the plurality of identified states comprises:

identifying the state for each of the plurality of aircraft using at least one of position information and speed to form the plurality of identified states.

8. The method claim 1, wherein the step of identifying the state for each of the plurality of aircraft to form the plurality of identified states comprises:

predicting a next state for each of the plurality of aircraft from a current state for each of the plurality of aircraft, wherein the next state is the state for each of the plurality of aircraft.

9. The method of claim 8, wherein the predicting step is performed using a vehicle state table.

10. A method for identifying sets of vehicles, the method comprising:

identifying a state for each of a plurality of vehicles to form a plurality of identified states, wherein identifying includes predicting a next state for each of the plurality of vehicles from a current state for each of the plurality of vehicles, wherein the next state is the state for each of the plurality of vehicles; and identifying a set of vehicles from the plurality of vehicles based on the plurality of identified states, wherein the set of vehicles forms a set of relevant vehicles.

11. The method of claim 10 further comprising:

identifying a number of undesired situations from the set of relevant vehicles.

12. The method of claim 11, wherein the step of identifying the number of undesired situations from the set of relevant vehicles comprises:

predicting a number of runway incursions.

13. The method of claim 10 further comprising:

identifying potential undesired situations for each vehicle in the set of relevant vehicles.

14. The method of claim 10, wherein the step of identifying the set of vehicles from the plurality of vehicles based on the plurality of identified states comprises:

comparing a state of each vehicle from the plurality of vehicles with a state of all other vehicles in the plurality of vehicles to form a number of comparisons; and identifying the set of vehicles using the number of comparisons to form the set of relevant vehicles.

15. The method of claim 14, wherein the steps of comparing the state of each vehicle from the plurality of vehicles with the state of all other vehicles in the plurality of vehicles to form the number of comparisons and identifying the set of vehicles using the number of comparisons to form the set of relevant vehicles are performed using a dynamic relevant traffic state table.

16. The method of claim 10, wherein the plurality of vehicles is selected from at least one of aircraft, ground vehicles, spacecraft, surface ships, and submarines.

17. A data processing system comprising:

a bus;

a communications unit connected to the bus;

a storage device connected to the bus, wherein the storage device includes program code; and a processor unit connected to the bus, wherein the processor unit executes the program code to identify a state for each of a plurality of aircraft to form a plurality of identified states; identify a set of aircraft from the plurality of aircraft based on the plurality of identified states using a state definition to form a set of identified aircraft; and predict a number of potential runway incursions using the set of identified aircraft.

18. The data processing system of claim 17, wherein in executing the program code to identify the set of aircraft from the plurality of aircraft based on the plurality of identified states to form the set of identified aircraft, the processor unit executes the program code to identify the set of aircraft from the plurality of aircraft based on the plurality of identified states to form the set of identified aircraft using a state machine.

19. The data processing system of claim 17, wherein the state definition comprises a table comprising a plurality of states and conditions for the plurality of states.

20. The data processing system of claim 17, wherein in executing the program code to identify the set of aircraft from the plurality of aircraft based on the plurality of identified states to form the set of identified aircraft, the processor unit executes the program code to select an aircraft from the plurality of aircraft to form a selected aircraft; compare a first state of the selected aircraft with a second state for a second aircraft in the plurality of aircraft to form a comparison; and determine whether to identify the second aircraft as being part of the set of identified aircraft from the comparison.

21. A computer program product for predicting runway incursions, the computer program product comprising:

a computer recordable storage medium;

program code, stored on the computer recordable storage medium, for identifying a state for each of a plurality of aircraft using a state definition to form a plurality of identified states;

program code, stored on the computer recordable storage medium, for identifying a set of aircraft from the plurality of aircraft based on the plurality of identified states to form a set of identified aircraft; and program code, stored on the computer recordable storage medium, for predicting a number of potential runway incursions using the set of identified aircraft.

22. The computer program product of claim 21, wherein the program code, stored on the computer recordable storage medium, for identifying the set of aircraft from the plurality of aircraft based on the plurality of identified states to form the set of identified aircraft comprises:

program code, stored on the computer recordable storage medium, for identifying the set of aircraft from the plurality of aircraft based on the plurality of identified states to form the set of identified aircraft using a state machine.

23. The computer program product of claim 21, wherein the state definition comprises a table comprising a plurality of states and conditions for the plurality of states.

24. The computer program product of claim 21, wherein the program code, stored on the computer recordable storage medium, for identifying the set of aircraft from the plurality of aircraft based on the plurality of identified states to form the set of identified aircraft comprises:

program code, stored on the computer recordable storage medium, for selecting an aircraft from the plurality of aircraft to form a selected aircraft;

program code, stored on the computer recordable storage medium, for comparing a first state of the selected aircraft with a second state for a second aircraft in the plurality of aircraft to form a comparison; and program code, stored on the computer recordable storage medium, for determining whether to identify the second aircraft as being part of the set of identified aircraft from the comparison.

* * * * *